(12) United States Patent
Arai et al.

(10) Patent No.: US 9,739,974 B2
(45) Date of Patent: Aug. 22, 2017

(54) LENS BARREL

(71) Applicant: OLYMPUS CORPORATION, Shibuya-ku, Tokyo (JP)

(72) Inventors: Norio Arai, Tokyo (JP); Tomohide Yano, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/849,401

(22) Filed: Sep. 9, 2015

(65) Prior Publication Data
US 2016/0147037 A1    May 26, 2016

(30) Foreign Application Priority Data
Nov. 21, 2014    (JP) ................ 2014-236801

(51) Int. Cl.
*G02B 9/00* (2006.01)
*G02B 7/14* (2006.01)
*G02B 7/10* (2006.01)

(52) U.S. Cl.
CPC ............... *G02B 7/14* (2013.01); *G02B 7/102* (2013.01)

(58) Field of Classification Search
CPC ........................................................ G02B 7/14
USPC ........................................................ 359/754
See application file for complete search history.

(56) References Cited

U.S. PATENT DOCUMENTS

| 5,860,030 A * | 1/1999 | Tada et al. ............. G03B 17/04 396/72 |
| 2005/0174657 A1* | 8/2005 | Honsho .................... G02B 7/08 359/819 |

FOREIGN PATENT DOCUMENTS

JP         2000147350 A     5/2000

* cited by examiner

*Primary Examiner* — James Jones
(74) *Attorney, Agent, or Firm* — Holtz, Holtz & Volek PC

(57) ABSTRACT

An interchangeable lens has a lens frame holding a movable lens group, another lens frame holding another movable lens group, one actuator that drives one lens frame, and the other actuator that drives the other lens frame. A first yoke forming a magnetic circuit of the one actuator and a second yoke forming a magnetic circuit of the other actuator are disposed away from each other in an optical axis direction, and a nonmagnetic member is interposed between the first yoke and the second yoke.

9 Claims, 17 Drawing Sheets

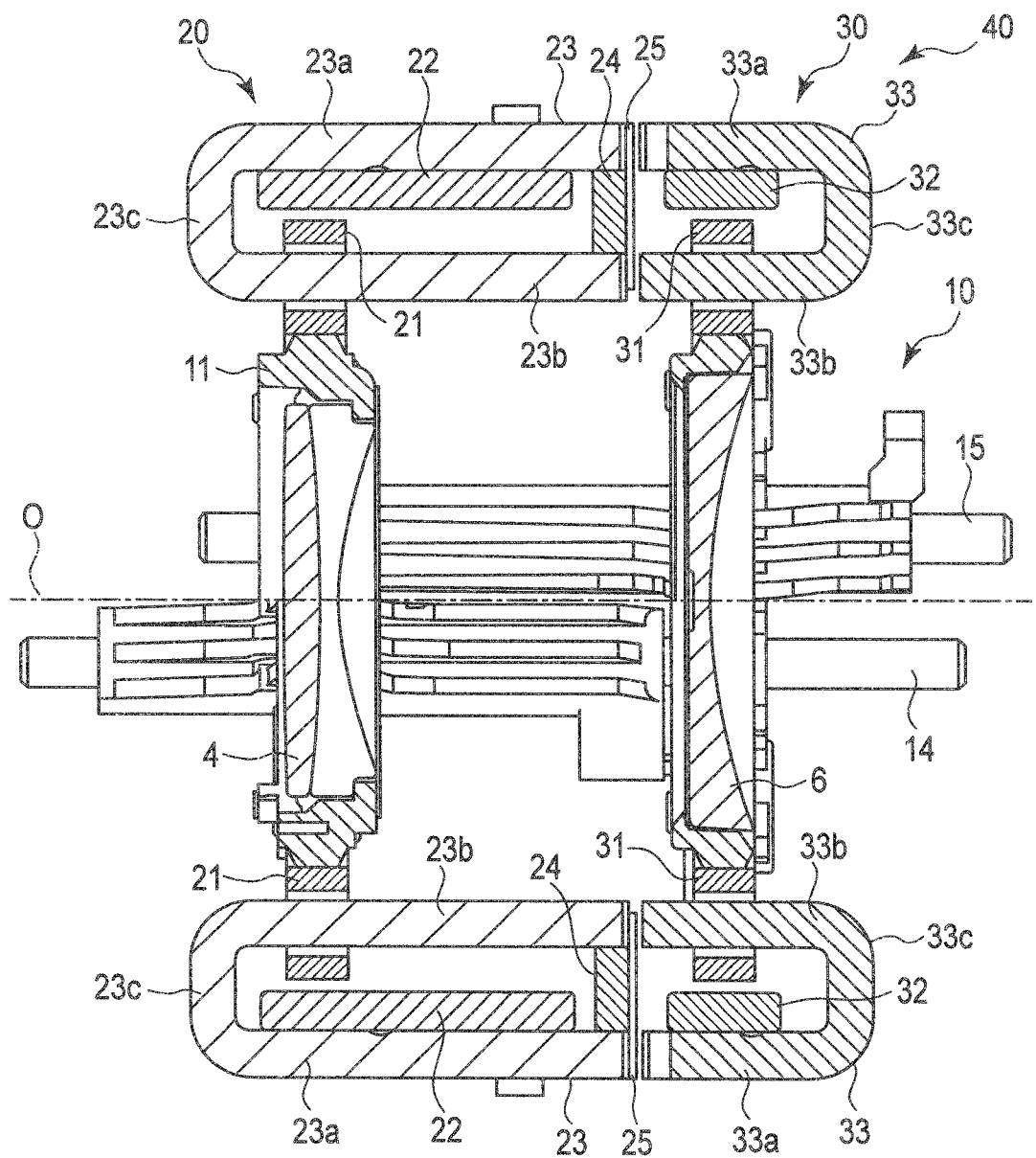
F I G. 3

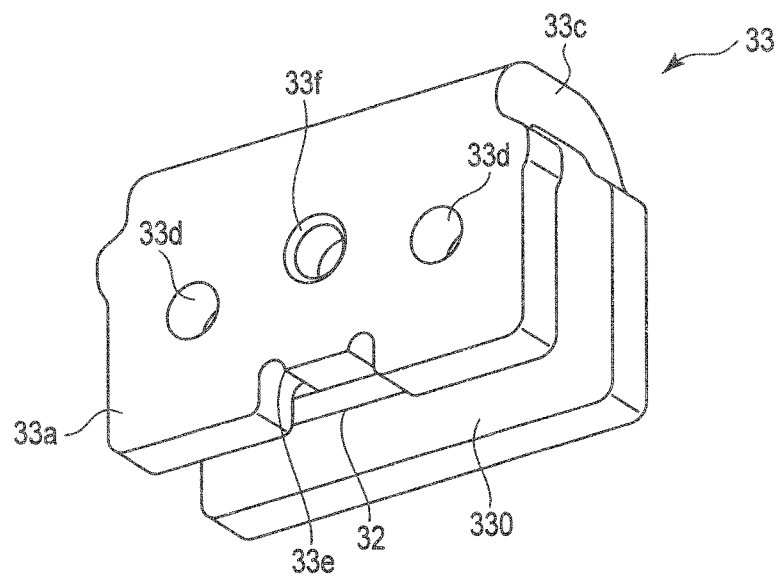
F I G. 14
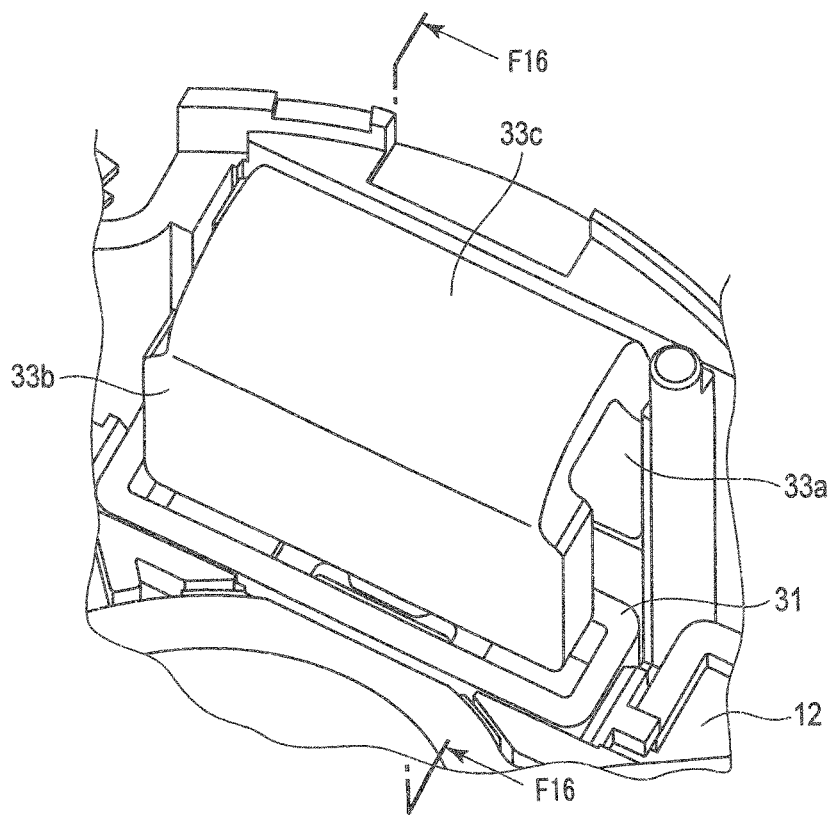
F I G. 15

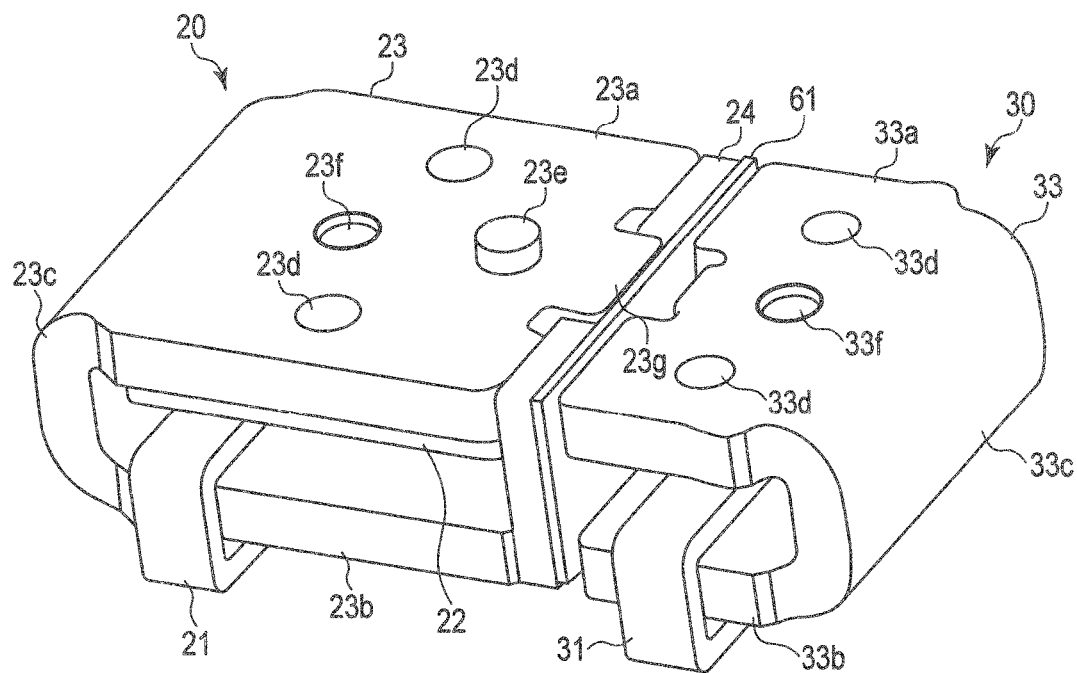
F I G. 18
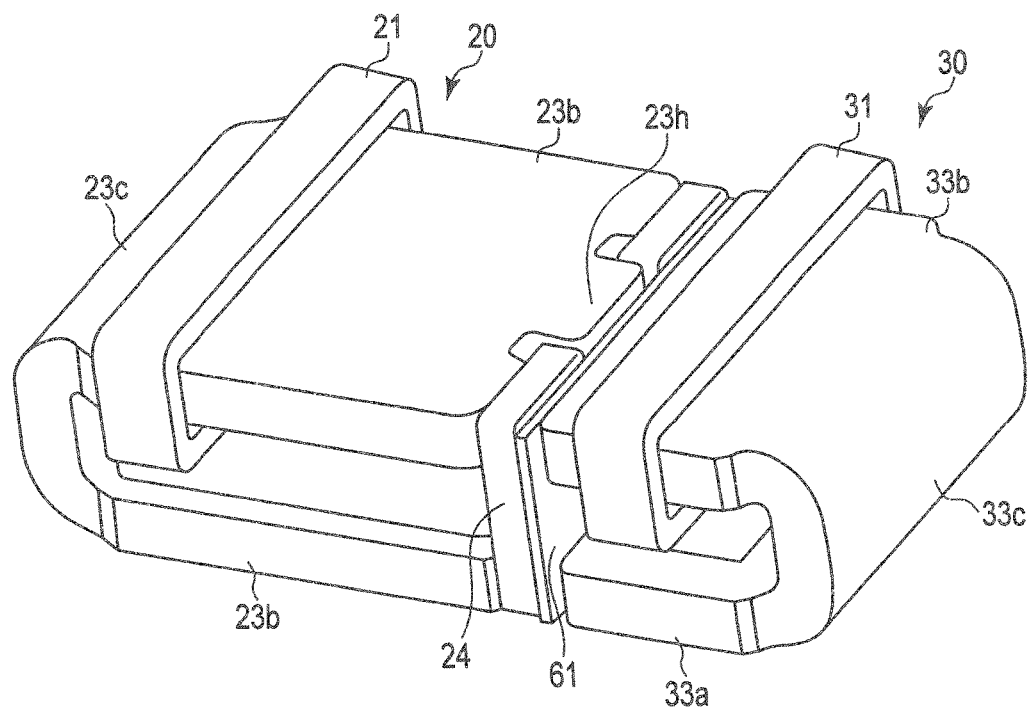
F I G. 19

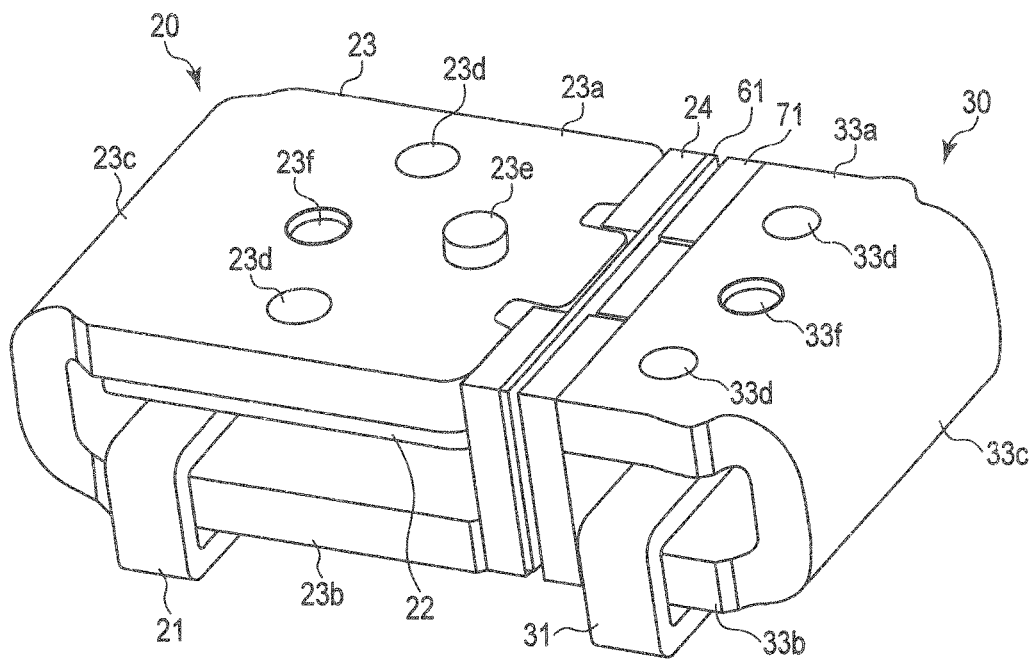
F I G. 20
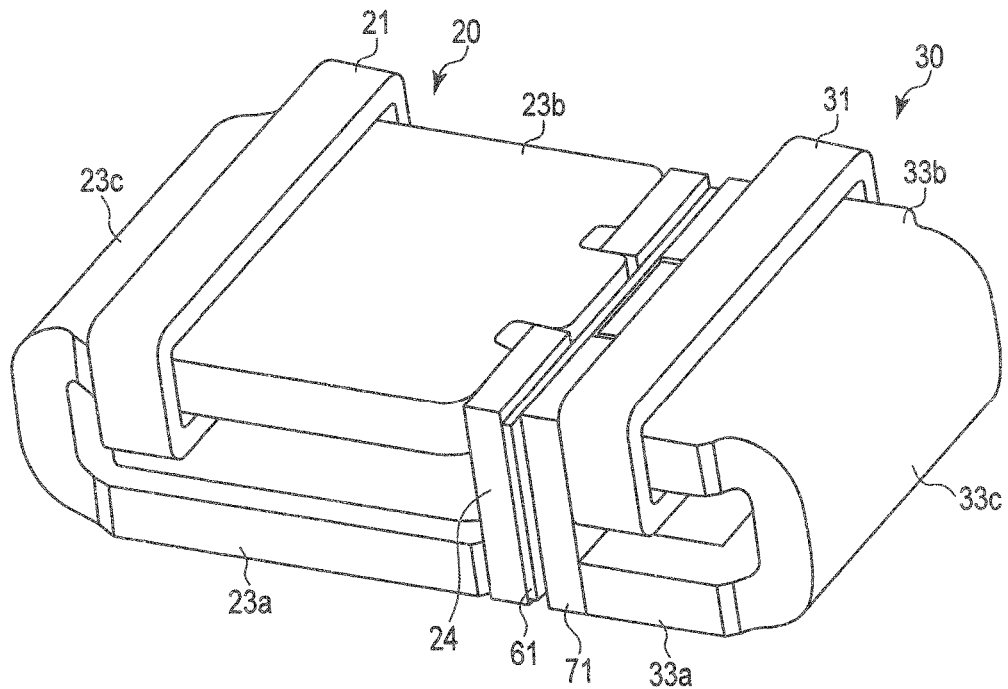
F I G. 21

LENS BARREL

CROSS-REFERENCE TO RELATED APPLICATIONS

This application is based upon and claims the benefit of priority from Japanese Patent Application No. 2014-236801, filed Nov. 21, 2014, the entire contents of which are incorporated herein by reference.

BACKGROUND OF THE INVENTION

This invention relates to a lens barrel having, for example, two lens groups that are movable in an optical axis direction.

As a lens barrel, there is known, for example, an interchangeable lens of a camera comprising two actuators that move two lens groups in an optical axis direction, respectively (e.g., the publication of Jpn. Pat. Appln. KOKAI Publication No. 2000-147350). Each of the two actuators is a voice coil motor (VCM) including a coil, a magnet, and a yoke. One of the coil and the magnet of each actuator is attached to a movable member holding the lens group, and the other one of the coil and the magnet is attached to an outer frame.

This interchangeable lens comprises the two actuators arranged in the optical axis direction, and hence, a single yoke can be used to the two actuators. Thus, the number of components can be decreased, assembly can be facilitated, and manufacturing cost can be suppressed.

However, in the case that the yoke forming magnetic circuits of the two actuators is constituted of a single member, when one lens group is moved by one actuator, a magnetic force acts on the other actuator due to mutual induction, which causes the disadvantage that the other lens group is moved. In this case, the magnetic force due to this mutual induction becomes a noise component, whereby the two lens groups cannot accurately be driven and controlled.

BRIEF SUMMARY OF THE INVENTION

An object of the present invention is to provide a lens barrel which can drive and control two lens groups.

To achieve the above object, a lens barrel concerning an embodiment of the present invention is a lens barrel in which a first movable member holding a first lens group and a second movable member holding a second lens group are arranged in an optical axis direction and are movably stored. The lens barrel comprises a first actuator in which a first magnetic circuit is constituted of a first coil, a first magnet disposed to face the first coil and a first yoke and which moves the first movable member in the optical axis direction by the first magnetic circuit; and a second actuator in which a second magnetic circuit magnetically independent of the first magnetic circuit is constituted of a second coil, a second magnet disposed to face the second coil and a second yoke and which moves the second movable member in the optical axis direction by the second magnetic circuit; wherein the first yoke is disposed away from the second yoke as much as a predetermined distance in the optical axis direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a cross-sectional view showing an assembly in which there are assembled two movable lens groups incorporated in the interchangeable lens of FIG. 2, a support mechanism and two actuators are assembled;

FIG. 14 is a perspective view showing a second yoke;

FIG. 15 is a perspective view showing that the second yoke of FIG. 14 is incorporated in the fixed frame;

FIG. 18 is a perspective view showing a main part of an actuator according to a second embodiment;

FIG. 19 is a perspective view of a constitution of FIG. 18 seen from an opposite side;

FIG. 20 is a perspective view showing a main part of an actuator according to a third embodiment;

FIG. 21 is a perspective view of a constitution of FIG. 20 seen from an opposite side;

DETAILED DESCRIPTION

Hereinafter, embodiments of the present invention will be described with reference to the drawings.

Figure 1:
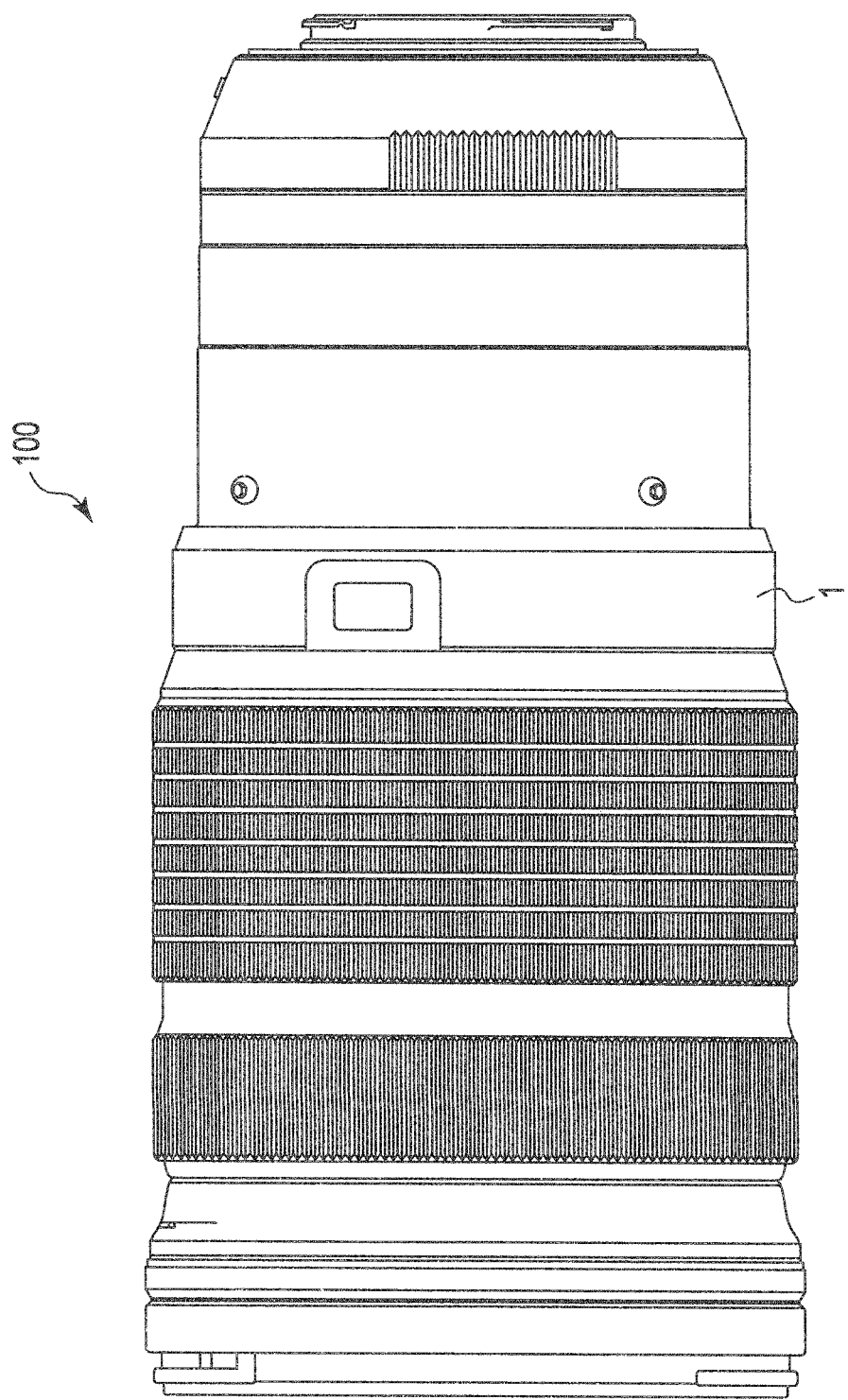
FIG. 1 is an appearance view of an interchangeable lens according to a first embodiment.
Figure 2:
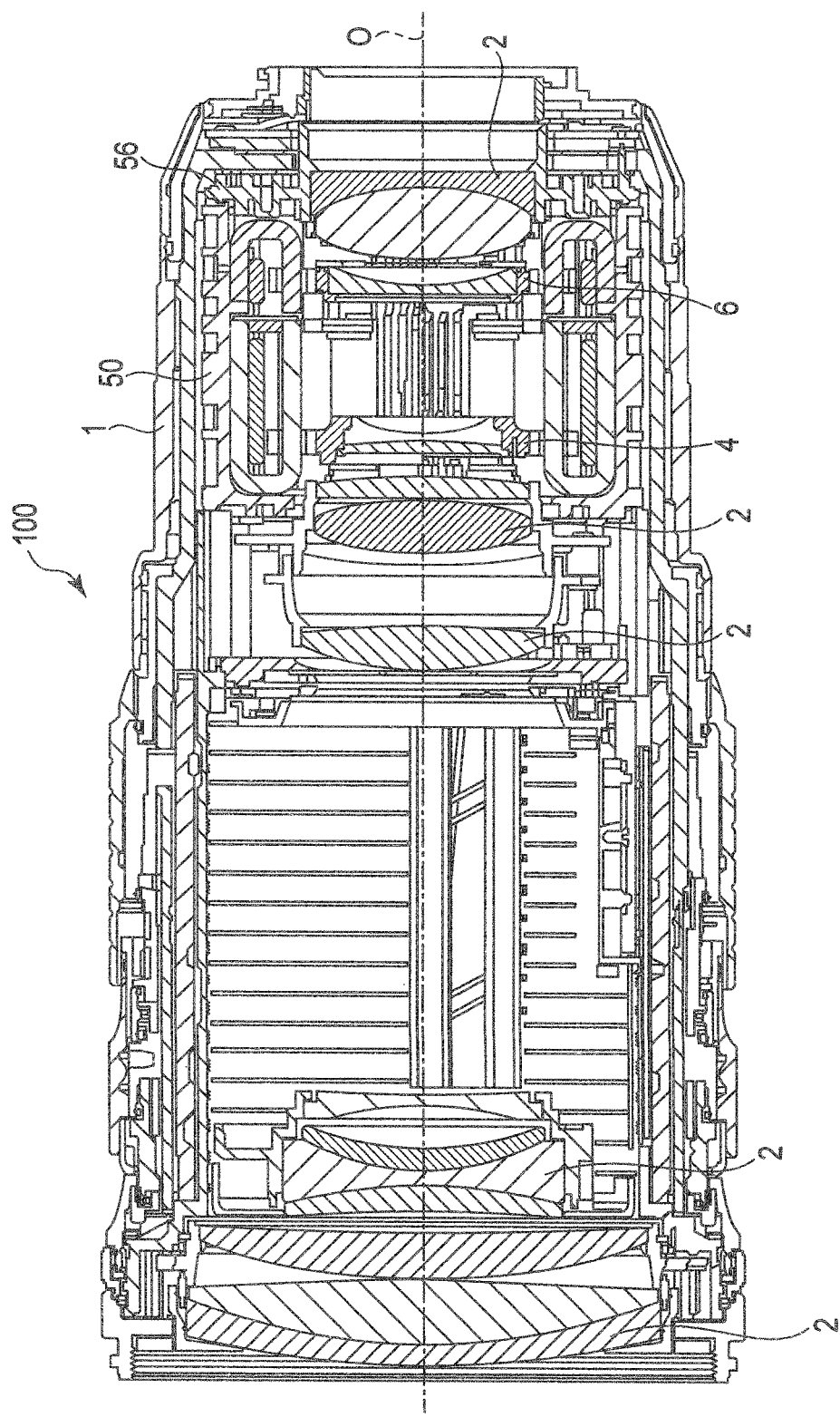
FIG. 2 is a vertical cross-sectional view of the interchangeable lens of FIG. 1.

FIG. 1 is an appearance view showing an interchangeable lens 100 that is a first embodiment of a lens barrel of the present invention. In addition, FIG. 2 is a cross-sectional view of the interchangeable lens 100 of FIG. 1 which is cut along a plane including an optical axis O of the lens. The interchangeable lens 100 is, for example, an interchangeable lens detachably attached to an unshown digital camera here, and has after-mentioned two movable lens groups 4 and 6. In the following description, an unshown subject side (a left side shown in the drawing) along the optical axis O will be referred to as a front, and an unshown camera body side (a right side shown in the drawing) will be referred to as a rear.

The interchangeable lens 100 has a substantially cylindrical outer frame 1 whose outer diameter slightly becomes larger along the optical axis O toward the front. In the outer frame 1, fixed lens groups 2 disposed away from each other along the optical axis O are fixed. Additionally, in the outer frame 1, there are disposed the two movable lens groups 4 and 6 movable in a forward-backward direction along the optical axis O. The movable lens groups 4 and 6 are incorporated in an after-mentioned fixed frame 50 (FIG. 5) and attached to inner portions of the outer frame 1. The respective lens groups 2, 4 and 6 are attached to the same shaft in a posture in which the optical axis O passes centers of the lens groups.

Figure 4:
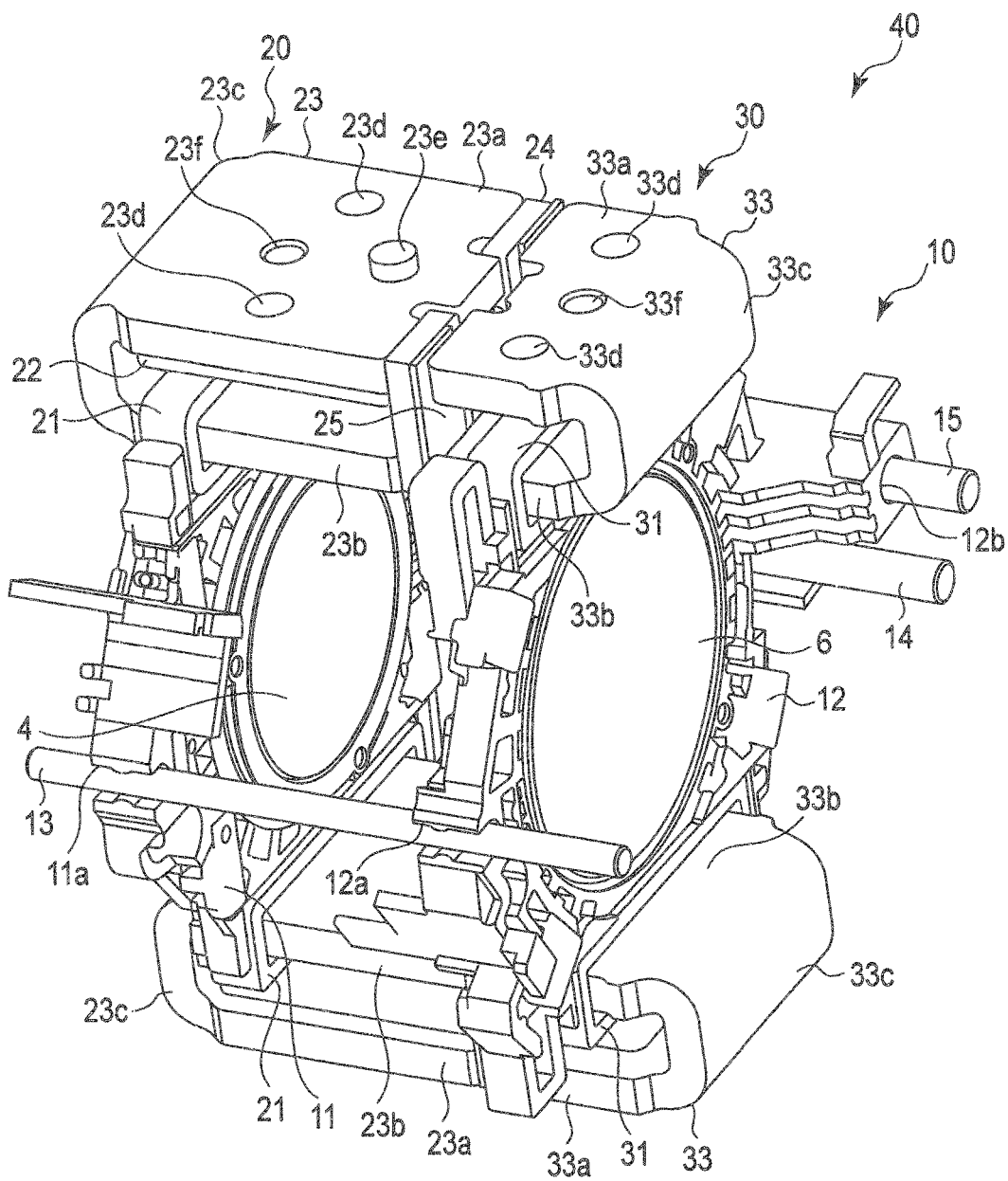
FIG. 4 is a perspective view showing the assembly of FIG. 3.

FIG. 3 is an enlarged cross-sectional view showing an assembly 40 in which there are assembled a support mechanism 10 that supports the two movable lens groups 4 and 6 so that the groups are movable in an optical axis O direction, an actuator 20 (a first actuator) that drives the front movable lens group 4, and an actuator 30 (a second actuator) that drives the rear movable lens group 6. In addition, FIG. 4 is a perspective view showing the assembly 40 of FIG. 3. The assembly 40 is incorporated in the after-mentioned fixed frame 50 and attached to an inner portion of the outer frame 1.

The support mechanism 10 supports a lens frame 11 (a first movable member) holding the front movable lens group 4 (a first lens group) so that the lens frame is movable in the optical axis O direction, and the support mechanism supports a lens frame 12 (a second movable member) holding the rear movable lens group 6 (a second lens group) so that the lens frame is movable in the optical axis C) direction. The actuator 20 drives the front lens frame 11 supported by the support mechanism 10 in the forward-backward direction along the optical axis O. The actuator 30 drives the rear lens frame 12 supported by the support mechanism 10 in the forward-backward direction along the optical axis O.

More specifically, the support mechanism 10 has the lens frame 11 holding the front movable lens group 4 and the lens frame 12 holding the rear movable lens group 6. The two lens frames 11 and 12 are arranged in the optical axis O direction so that each lens frame has a posture along a plane orthogonal to the optical axis O. A movable range of each of the lens frames 11 and 12 is limited to a range in which both the lens frames do not come in contact with each other, by an unshown stopper or the like.

In addition, the support mechanism 10 has three guide shafts 13, 14 and 15 each having a round cross section and holding the two lens frames 11 and 12 so that the lens frames are movable in the optical axis O direction. The three guide shafts 13, 14 and 15 are disposed close to an inner surface of the fixed frame 50 to be extended in parallel with the optical axis O, and fixed to the fixed frame 50. The two guide shafts 14 and 15 are disposed away from each other in a lens radial direction and disposed on an opposite side to the guide shaft 13. A diameter of the guide shaft 13 is smaller than a diameter of each of the guide shafts 14 and 15.

One guide shaft 13 having a small diameter holds the two lens frames 11 and 12 so that the lens frames are movable. One guide shaft 14 having a large diameter holds the front lens frame 11 so that the lens frame is movable. The other guide shaft 15 having a large diameter holds the rear lens frame 12 so that the lens frame is movable. In a different way of seeing, the front lens frame 11 is movably held by the two guide shafts 13 and 14, and the rear lens frame 12 is movably held by the two guide shafts 13 and 15.

On the other hand, the front lens frame 11 has a U-shaped fitting groove 11a that fits with the guide shaft 13, and the rear lens frame 12 has a U-shaped fitting groove 12a that fits with the guide shaft 13. In addition, the front lens frame 11 has a through hole 11b into which the guide shaft 14 is inserted, and the rear lens frame 12 has a through hole 12b into which the guide shaft 15 is inserted. The through hole 11b of the lens frame 11 is disposed away on an opposite side to the fitting groove 11a in the lens radial direction, and the through hole 12b of the lens frame 12 is disposed away on an opposite side to the fitting groove 12a in the lens radial direction.

The actuator 20 to drive the front movable lens group 4 has two driving sections that are disposed away from each other and face each other in the lens radial direction, and the actuator 30 to drive the rear movable lens group 6 has two driving sections that are disposed away from each other and face each other in the lens radial direction. In each actuator, one driving section has a structure similar to that of the other driving section, and functions similarly to the other driving section, and hence, the one driving section will be described and description of the other driving section will be omitted.

The actuator 20 to drive the front lens frame 11 includes a first coil 21 fixed to an outer edge portion of the lens frame 11, a first magnet 22 disposed away outwardly from the first coil 21, facing the first coil and fixed to the side of the fixed frame 50, and a first yoke 23 that cooperates with the first magnet 22 and the first coil 21 to form a first magnetic circuit. In addition, the actuator 20 has a third yoke 24 disposed in contact with an end portion of the first yoke 23 which faces an after-mentioned second yoke 33. The third yoke 24 constitutes a part of the first magnetic circuit.

The first yoke 23 has a U-shaped cross section whose end portion on a side (a front side) away from the after-mentioned second yoke 33 is turned back, and has a structure where a substantially rectangular magnetic body plate is bent into halves from a center of the plate. More specifically, the first yoke 23 has a first portion 23a (an extending portion) fixed to the inner surface of the fixed frame 50, a second portion 23b (an extending portion) disposed away from the first portion 23a to an inner side of the fixed frame 50 to face the first portion, and a coupling portion 23c integrally and smoothly coupling one end of the first portion 23a with one end of the second portion 23b. The first yoke 23 has an opening 230 at the other ends of the first portion 23a and the second portion 23b. The third yoke 24 is attached to a position at which the opening 230 is closed.

The first magnet 22 is attached to an inner surface of the first portion 23a of the first yoke 23 which is disposed away from the fixed frame 50. The second portion 23b of the first yoke 23 is inserted, into the first coil 21 in a non-contact state. The first coil 21 also has the non-contact state to the first magnet 22. Consequently, the first coil 21 does not come in contact with any peripheral members but is movable in the optical axis O direction along the second portion 23b of the first yoke 23.

The first yoke 23 may have any shape such as a box shape as long as the first yoke has a structure where the first coil 21 is movable along the second portion 23b. In addition, the opening 230 may have a cubic shape that enters a side surface even in a plane vertical to the optical axis O. Furthermore, the first portion 23a and the second portion 23b may have different shapes. A cross section of the first yoke 23 in the optical axis O direction is a U-shaped cross section.

Therefore, when the first coil 21 is energized from an unshown driving circuit, a magnetic field having a direction corresponding to a direction of a current is generated around the first coil 21, a magnetic force acts on the first coil 21 from the first magnet 22 by electromagnetic induction, and the lens frame 11 is moved to one end side in the optical axis direction. In addition, when the direction of the current to energize the first coil 21 is changed, the lens frame 11 is moved to the other end side in the optical axis direction.

On the other hand, the actuator 30 to drive the rear lens frame 12 includes a second coil 31 fixed to an outer edge portion of the lens frame 12, a second magnet 32 disposed away to the outside of the second coil 31, facing the second coil and fixed to the fixed frame 50 side, and the second yoke 33 that cooperates with the second magnet 32 and the second coil 31 to form a second magnetic circuit.

The second yoke 33 has a U-shaped cross section whose end portion on a side (the rear side) away from the first yoke 23 is turned back, and has a structure where a substantially rectangular magnetic body plate is bent into halves from a center of the plate. More specifically, the second yoke 33 has a first portion 33a (an extending portion) fixed to the inner surface of the fixed frame 50, a second portion 33b (an extending portion) disposed away from the first portion 33a to the inner side of the fixed frame 50 to face the first portion, and a coupling portion 33c integrally and smoothly coupling one end of the first portion 33a with one end of the second portion 33b. The second yoke 33 has a shorter length along the optical axis O direction than the first yoke 23. The second yoke 33 has an opening 330 at the other ends of the first portion 33a and the second portion 33b.

The second magnet 32 is attached to an inner surface of the first portion 33a of the second yoke 33 which is disposed away from the fixed frame 50. The second portion 33b of the second yoke 33 is inserted into the second coil 31 in a non-contact state. The second coil 31 also has the non-contact state to the second magnet 32. Consequently, the second coil 31 does not come in contact with any peripheral members but is movable in the optical axis O direction along the second portion 33b of the second yoke 33.

The second yoke 33 may have any shape such as a box shape as long as the second yoke has a structure where the second coil 31 is movable along the second portion 33b. In addition, the opening 330 may have a cubic shape that enters a side surface even in the plane vertical to the optical axis O. Furthermore, the first portion 33a and the second portion 33b may have different shapes. A cross section of the second yoke 33 in the optical axis O direction is a U-shaped cross section.

Therefore, when the second coil 31 is energized from the unshown driving circuit, a magnetic field having a direction corresponding to the direction of the current is generated around the second coil 31, a magnetic force acts on the second coil 31 from the second magnet 32 by the electromagnetic induction, and the lens frame 12 is moved to one end side in the optical axis direction. In addition, when the direction of the current to energize the second coil 31 is changed, the lens frame 12 is moved to the other end side in the optical axis direction.

Next, there will be described structures to incorporate the respective constitutional elements 10, 20 and 30 of the assembly 40 in the fixed frame 50 and steps of incorporating the respective constitutional elements 10, 20 and 30 of the assembly 40 in the fixed frame 50, with reference to FIG. 5 to FIG. 16.

Figure 5:
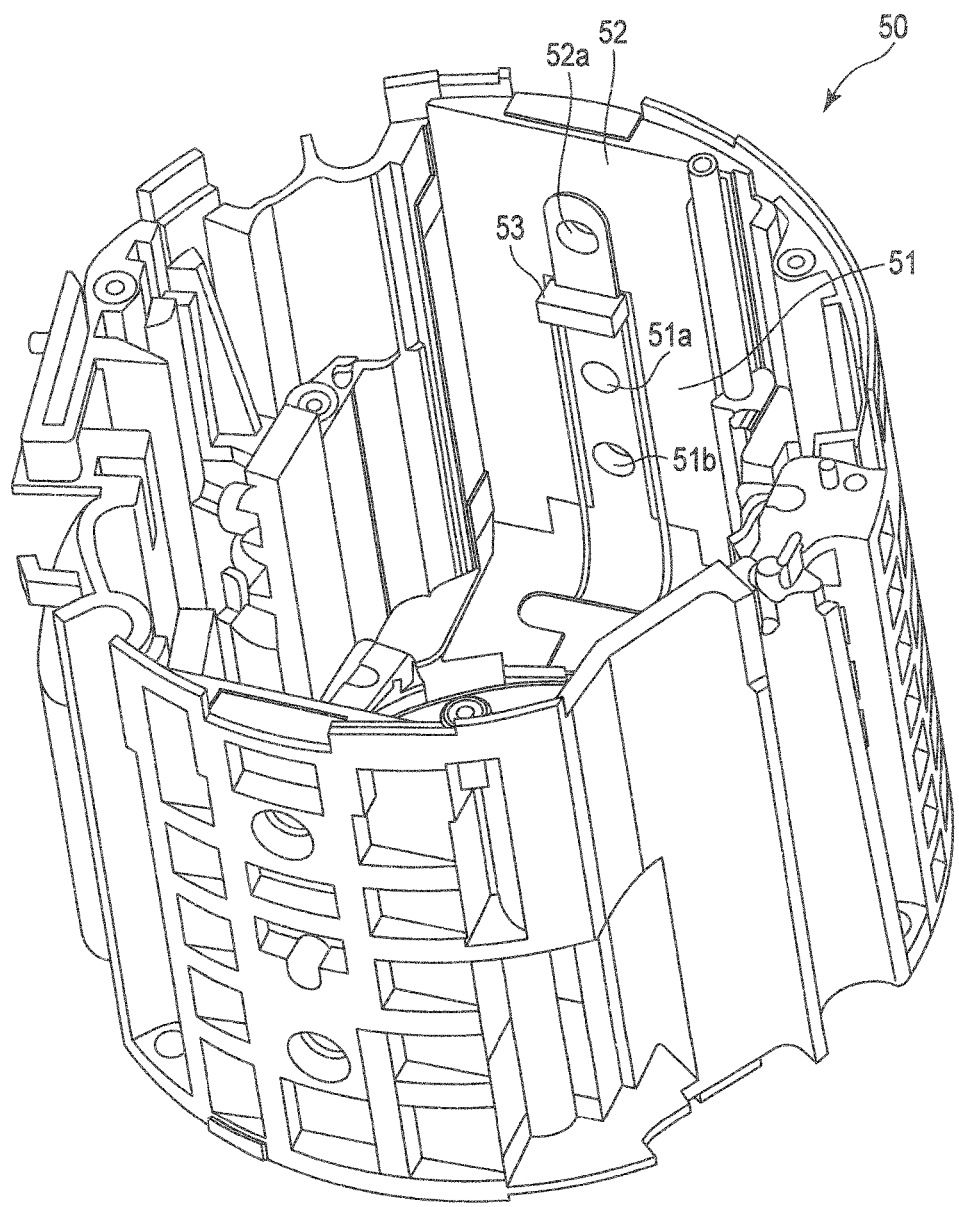
FIG. 5 is a perspective view showing a fixed frame via which the assembly of FIG. 4 is attached to the interchangeable lens of FIG. 1.

FIG. 5 is a perspective view showing the fixed frame 50 to be attached to the inner portion of the outer frame 1 of the interchangeable lens 100. The fixed frame 50 attached to the inner portion of the outer frame 1 as shown in FIG. 2 is integrated with the outer frame 1. Consequently, the inner surface of the fixed frame 50 functions as an inner surface of the outer frame 1. The fixed frame 50, in which the assembly 40 is incorporated, is inserted from a rear end side of the outer frame 1 to be attached to the outer frame. Detailed descriptions of an attaching structure of the fixed frame 50 to the outer frame 1 and an attaching method are omitted.

The fixed frame 50 has a first fixing portion 51 (a fixing portion) to fix the first yoke 23 to an inner wall of the fixed frame, a second fixing portion 52 (a fixing portion) to fix the second yoke 33 to the inner wall, and a rectangular block-like projection 53 (a positioning portion) that abuts on the second yoke 33 to dispose a clearance between the first yoke 23 and the second yoke 33 in the optical axis O direction. The projection 53 abuts on the end portion of the second yoke 33 which faces the first yoke 23 to position the second yoke 33, and forms the clearance between the first yoke 23 and the second yoke 33.

As described above, each of the actuators 20 and 30 to drive the movable lens groups 4 and 6 has two driving sections disposed away from each other in a radial direction. Consequently, the fixed frame 50 also comprises the constitutions 51, 52 and 53 to attach the first yoke 23 and the second yoke 33 of the driving sections to two positions of the inner wall which face each other in the radial direction. Here, one constitution is only representatively described, and description of the other constitution is omitted.

Figure 6:
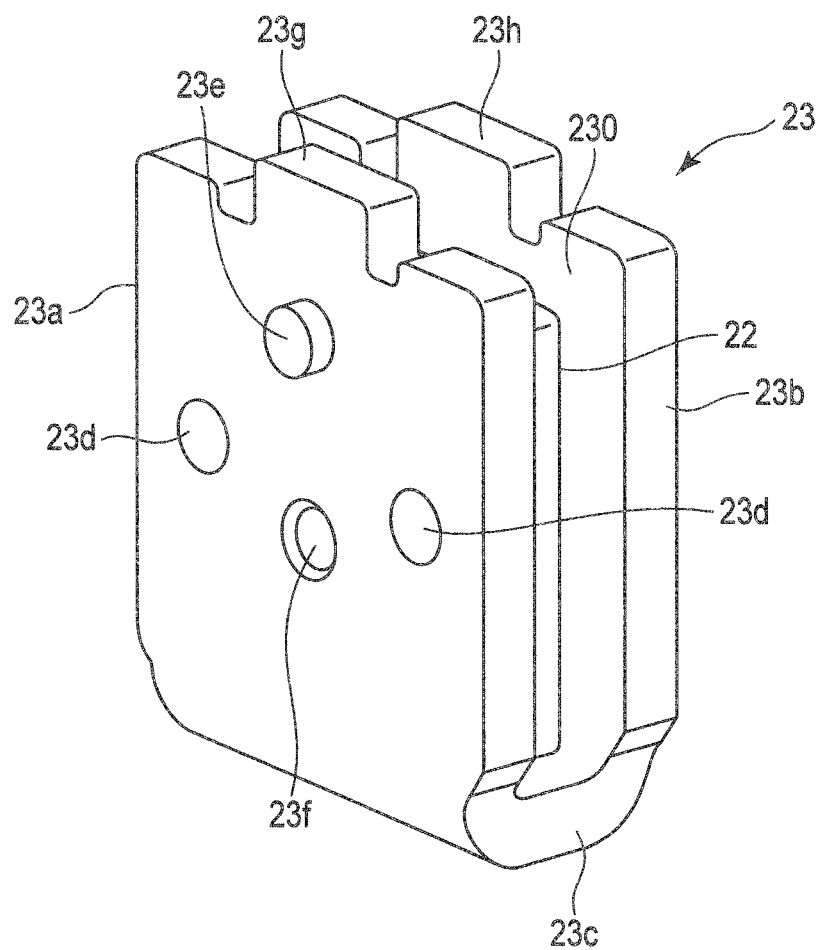
FIG. 6 is a perspective view showing a first yoke to be attached to the fixed frame of FIG. 5.
Figure 7:
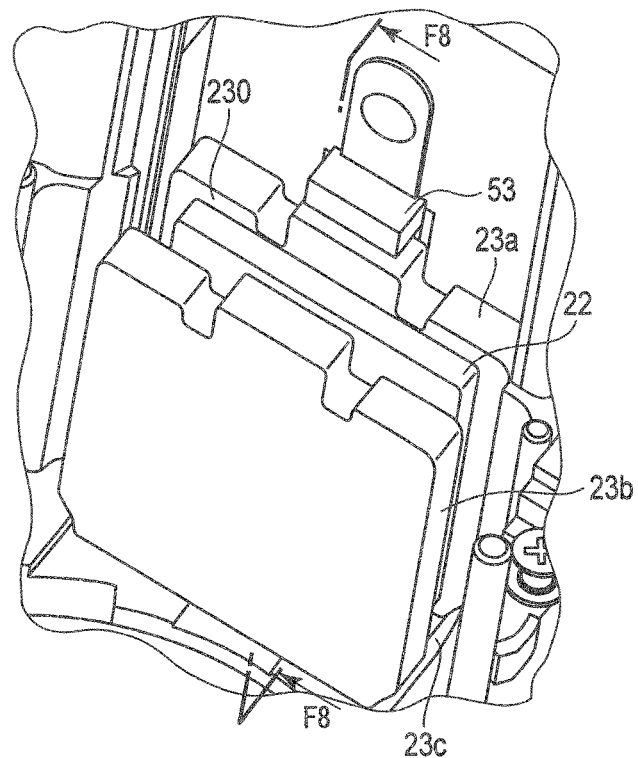
FIG. 7 is a perspective view showing that the first yoke of FIG. 6 is attached to the fixed frame of FIG. 5.
Figure 8:
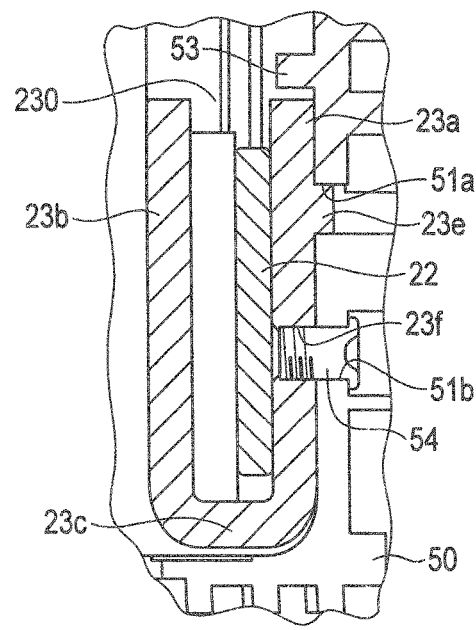
FIG. 8 is a partial cross-sectional view taken along the line F8-F8 of FIG. 7.

FIG. 6 is a perspective view showing the first yoke 23 to be attached to the first fixing portion 51 of the fixed frame 50, FIG. 7 is a perspective view showing that the first yoke 23 is attached to the first fixing portion 51 of the fixed frame 50, and FIG. 8 is a partial cross-sectional view taken along the line F8-F8 of FIG. 7. The first yoke' 23 comprises the first magnet 22 on the inner surface of the first portion 23a. The first magnet 22 is bonded and fixed to the first portion 23a. The first portion 23a comprises two through holes 23d into which an adhesive is poured.

First, the first yoke 23 comprising the first magnet 22 is attached to the first fixing portion 51 of the fixed frame 50. In this case, as to the first yoke 23, the coupling portion 23c is first inserted into the fixed frame 50 in a direction in which the first portion 23a faces the first fixing portion 51 of the fixed frame 50. Further, a boss 23e projected from an outer surface of the first portion 23a of the first yoke 23 is fitted into a positioning hole 51a disposed in the first fixing portion 51 of the fixed frame 50 to position the first yoke 23 to the fixed frame 50. Furthermore, a screw 54 is inserted from the outside of the fixed frame 50 through a screw inserting hole 51b, and screwed into a screw hole 23f disposed in the outer surface of the first portion 23a of the first yoke 23. In consequence, the first yoke 23 comprising the first magnet 22 is fixed to the first fixing portion 51 of the fixed frame 50.

Figure 9:
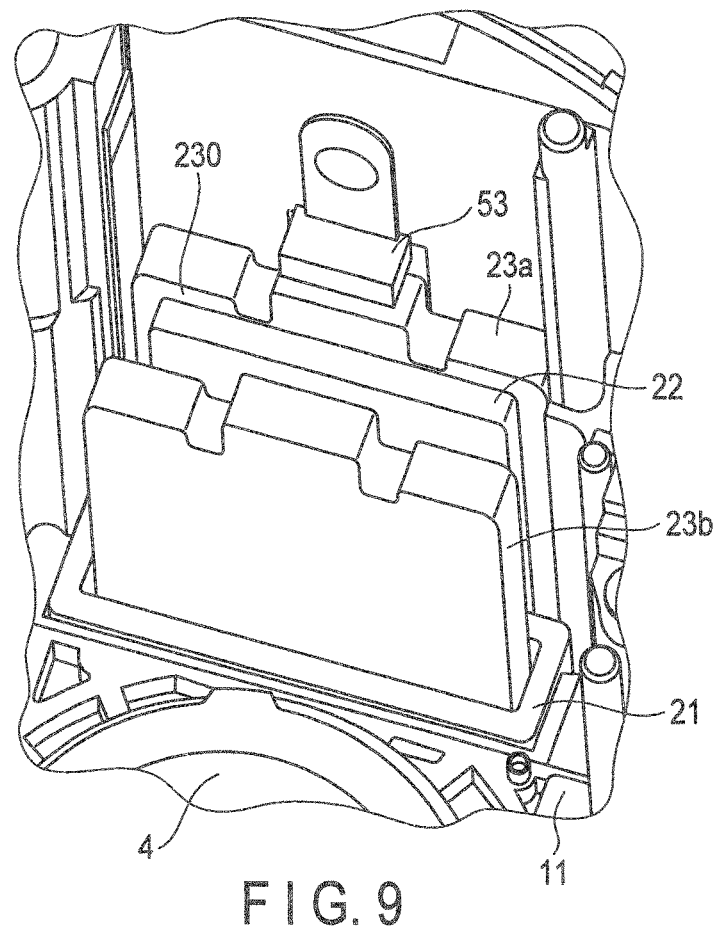
FIG. 9 is a perspective view showing that a front lens frame is incorporated.

Next, as shown in FIG. 9, the lens frame 11 holding the front movable lens group 4 is attached. In this case, the fitting groove 11a of the lens frame 11 is fitted with the guide shaft 13, the guide shaft 14 is inserted into the through hole 11b of the lens frame 11, and the second portion 23b of the first yoke 23 is inserted into the first coil 21 fixed to the lens frame 11. In this state, the movement of the lens frame 11 in a direction orthogonal to the optical axis O direction is restricted by the two guide shafts 13 and 14, and hence, the non-contact state of the first coil 21 is maintained to the first yoke 23.

Figure 10:
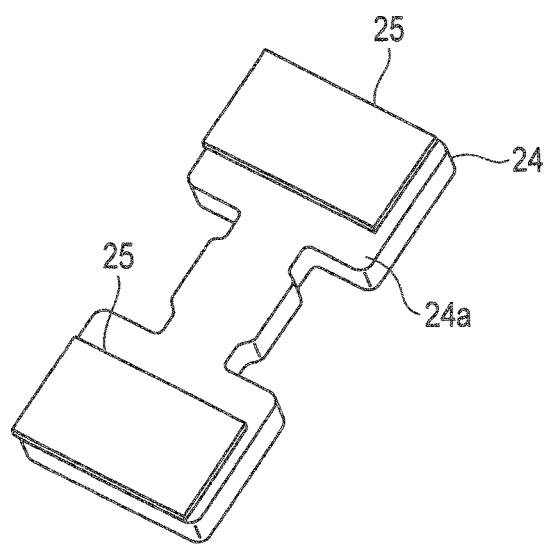
FIG. 10 is a perspective view showing a third yoke.

Next, the third yoke 24 is attached to close the rear opening 230 of the first yoke 23. FIG. 10 is a perspective view of the third yoke 24 seen from the side of the second yoke 33. The third yoke 24 is a plate-like magnetic body having a certain thickness, and comprises two rectangular sheet-like nonmagnetic members 25 having a uniform thickness on a surface 24a (an end portion) facing the second yoke 33. The two nonmagnetic members 25 are disposed away from each other in a longitudinal direction of the third yoke 24 and attached to the surface 24a. A function of each nonmagnetic member 25 will be described in detail later.

Figure 11:
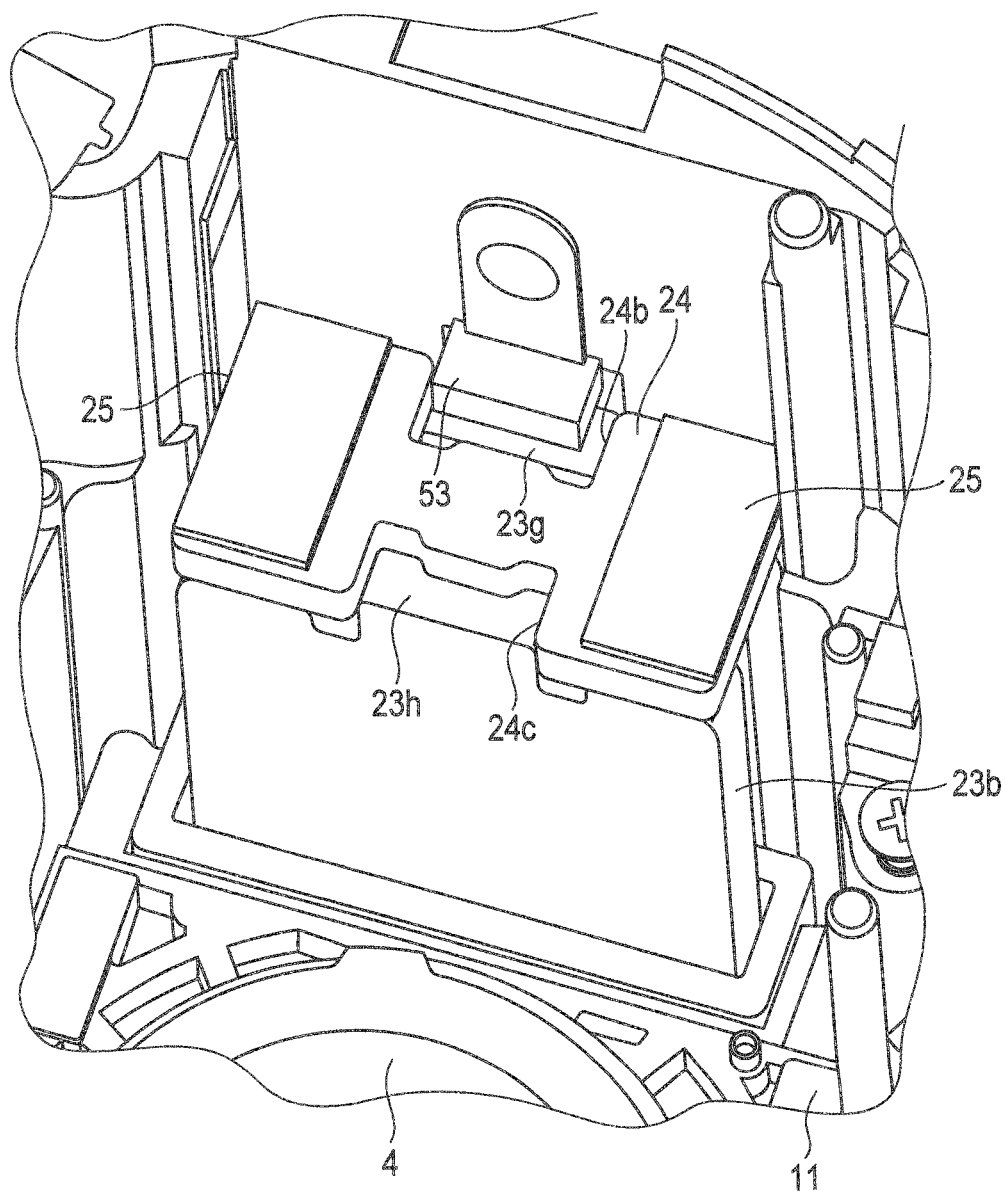
FIG. 11 is a perspective view showing that the third yoke of FIG. 10 is attached.

As shown in FIG. 11, the third yoke 24 comes in contact with the end portion of the first yoke 23 which faces the second yoke 33 to be attached to the end portion. The third yoke 24 is magnetically adsorbed by the first yoke 23 by the magnetic force of the first magnet 22. In other words, the third yoke 24 is not bonded to the first yoke 23. The third yoke 24 has a notch 24b to release a projection 23g projected from an end portion of the first portion 23a of the first yoke 23, and a notch 24c to release a projection 23h projected from an end portion of the second portion 23b of the first yoke 23. Furthermore, inner surfaces of the respective notches 24b and 24c come in contact with the respective projections 23g and 23h to be magnetically adsorbed. It is to be noted that the third yoke 24 attached to the first yoke 23 is disposed away from the first magnet 22 as shown in FIG. 3.

Figure 12:
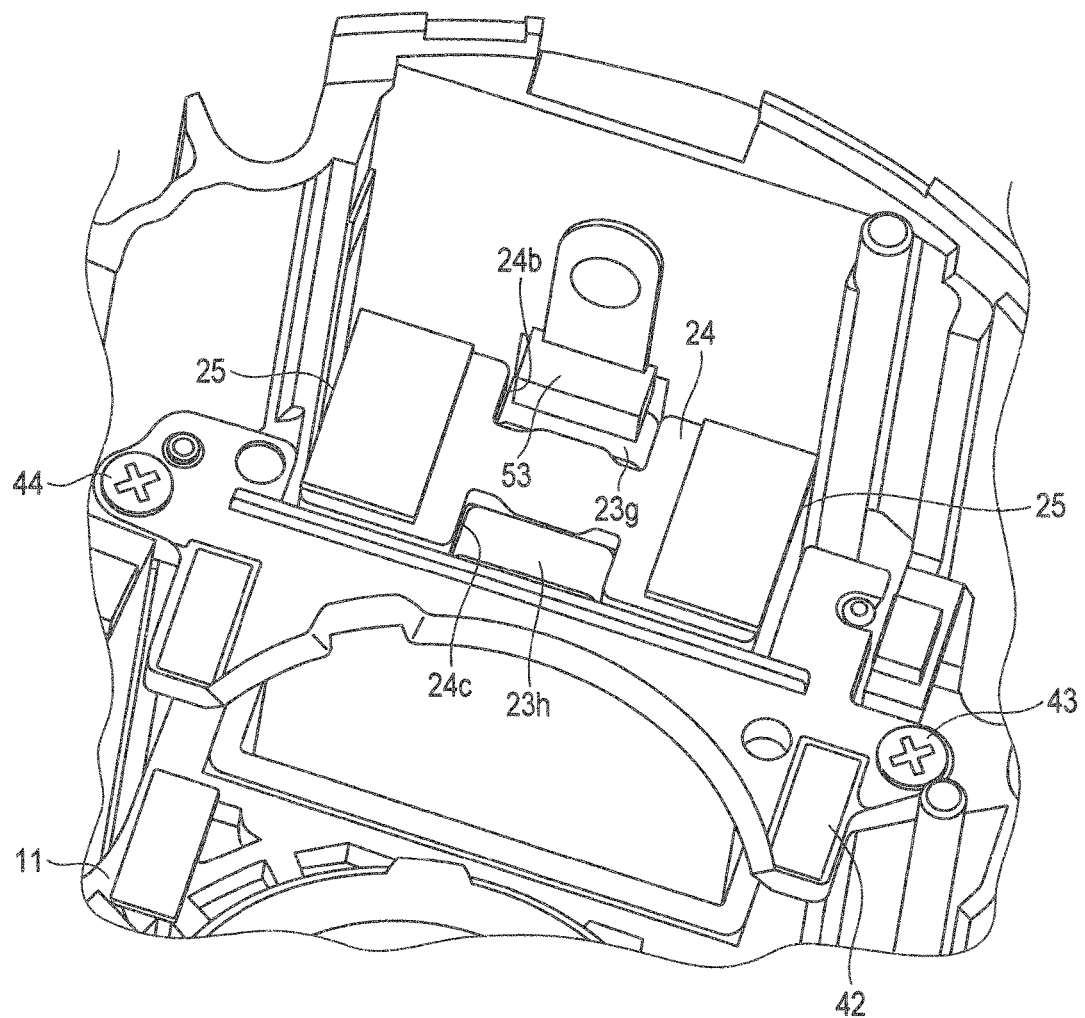
FIG. 12 is a perspective view showing that a damper die is attached.

Next, as shown in FIG. 12, a plate-like damper die 42 is attached. The damper die 42 is fastened and fixed to the fixed frame 50 by two screws 43 and 44. The damper die 42 is interposed between the two lens frames 11 and 12. The damper die 42 is attached to a peripheral member other than the fixed frame 50 in the non-contact state.

Figure 13:
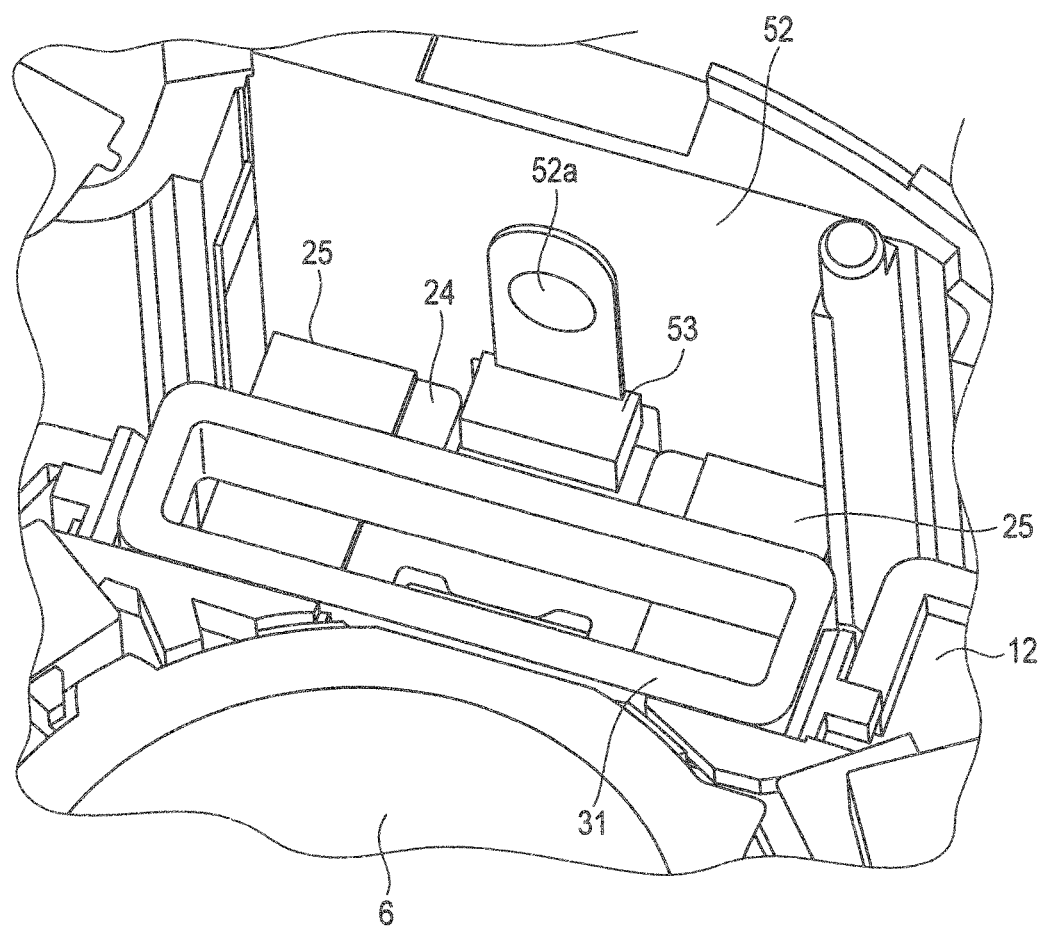
FIG. 13 is a perspective view showing that a rear lens frame is attached.

Next, as shown in FIG. 13, the lens frame 12 holding the rear movable lens group 6 is attached. In this case, the fitting groove 12a of the lens frame 12 is fitted with the guide shaft 13, and the guide shaft 15 is inserted into the through hole 12b of the lens frame 12. In consequence, by the two guide shafts 13 and 15, movement of the lens frame 12 in the direction orthogonal to the optical axis O is regulated, and the lens frame 12 is positioned.

Next, the second yoke 33 is attached to the second fixing portion 52 of the fixed frame 50. As shown in FIG. 14, the second yoke 33 comprises the second magnet 32 on the inner surface of the first portion 33a. The second magnet 32 is bonded and fixed to the first portion 33a. The first portion 33a has two through holes 33d into which an adhesive is poured.

As shown in FIG. 15, the second yoke 33 comprising the second magnet 32 is inserted into the fixed frame 50 first from a front end portion disposed away from the coupling portion 33c, i.e., the opening 330 in a direction in which the first portion 33a faces the second fixing portion 52 of the fixed frame 50. That is, in this state, the opening 230 of the first yoke 23 faces the opening 330 of the second yoke 33.

At this time, the second portion 33b of the second yoke 33 is inserted into the second coil 31 fixed to the lens frame 12. Furthermore, the projection 53 of the fixed frame 50 is fitted into a notch 33e disposed in an end portion of the first portion 33a which is disposed away from the coupling portion 33c to abut on the notch, and the second yoke 33 is positioned to the fixed frame 50. As described above, a part of the second yoke 33 abuts on the projection 53, thereby preventing the second yoke 33 from coming in contact with the first yoke 23.

Figure 16:
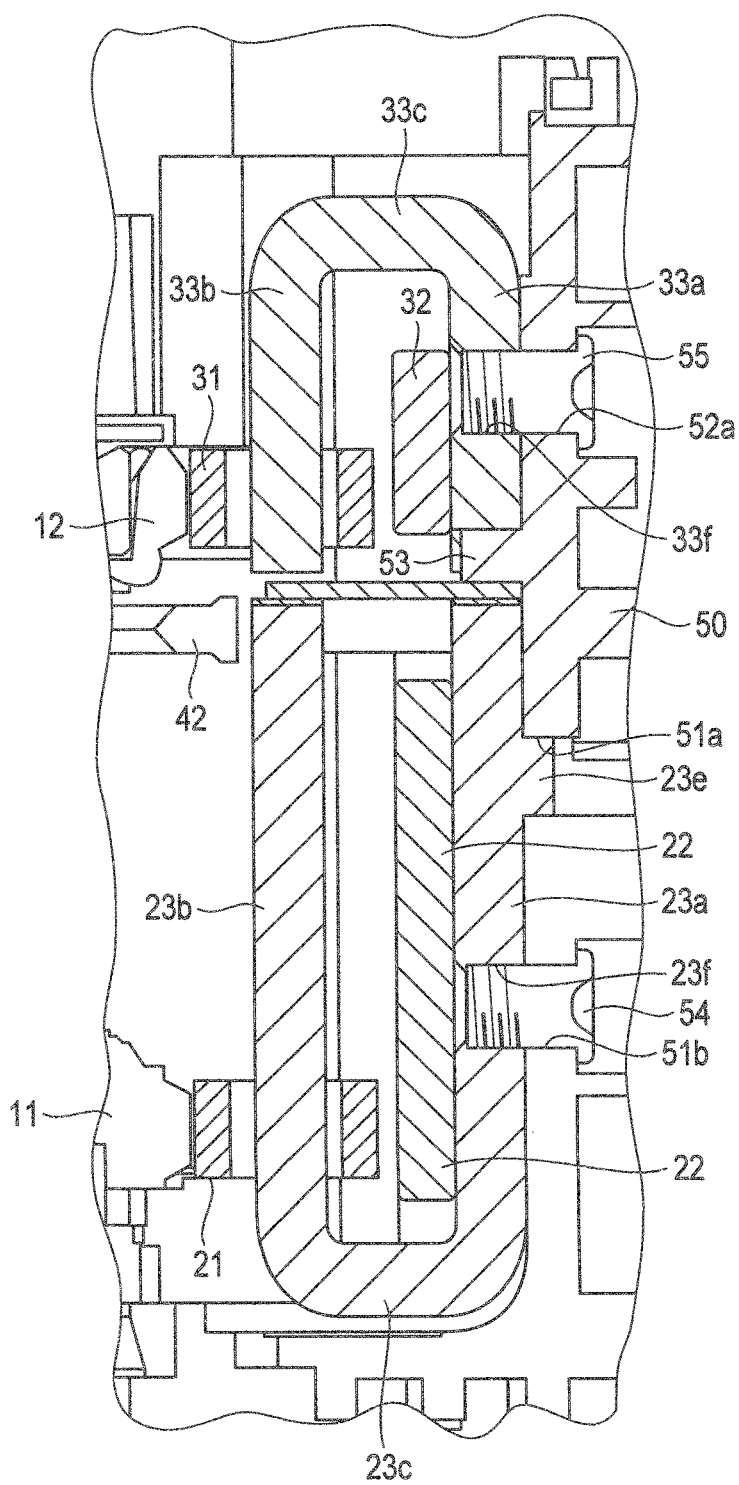
FIG. 16 is a partial cross-sectional view taken along the line F16-F16 of FIG. 15.

Afterward, as shown in FIG. 16, a screw 55 is inserted from the outside of the fixed frame 50 through a screw inserting hole 52a, and screwed into a screw hole 33f disposed in an outer surface of the first portion 33a of the second yoke 33. In consequence, the second yoke 33 comprising the second magnet 32 is fixed to the second fixing portion 52 of the fixed frame 50. By the abovementioned steps, the respective constitutional elements 10, 20 and 30 of the assembly 40 are incorporated in the fixed frame 50.

As described above, according to the present embodiment, the first yoke 23 (and the third yoke 24) of the actuator 20 and the second yoke 33 of the actuator 30 are disposed away from each other in the optical axis O direction to be separated from each other, so that during an operation of the one actuator 20 (30), the magnetic force that becomes a noise component can be prevented from acting on the other actuator 30 (20) due to mutual induction, and the two movable lens groups 4 and 6 can accurately be driven and controlled. The nonmagnetic members 25 interposed between the first yoke 23 and the second yoke 33 function to decrease influences of the magnetic force due to the mutual induction.

In addition, according to the present embodiment, the first yoke 23 and the second yoke 33 are formed into the U-shape, and hence, without disposing any openings in the side surface of the outer frame 1, the yokes 23 and 33 can easily be attached, so that an operability can improve. In addition, any unnecessary openings are not disposed in the outer frame 1, and hence, a rigidity of the outer frame 1 can be kept, so that a mechanical strength of the interchangeable lens 100 can be enhanced.

Furthermore, according to the present embodiment, the third yoke 24 is not bonded to the first yoke 23, so that the number of assembling steps can be decreased, a waiting time until the adhesive hardens can be eliminated, and manufacturing cost of the interchangeable lens 100 can be decreased.

Next, there will be described the function of each of the nonmagnetic members 25 attached to the surface 24a of the third yoke 24 which faces the second yoke 33.

In the present embodiment, as described above, the third yoke 24 is not bonded or fixed to the first yoke 23, and by the magnetic force of the first magnet 22, the third yoke 24 is magnetically adsorbed to the first yoke 23. A magnetic suction force to the third yoke 24 by the first magnet 22 is designed at a sufficient strength so that both the yokes are not separated in a usual use environment. However, for example, when a strong impact is applied to the outer frame 1 due to dropping of the interchangeable lens 100 from a high place, or the like, it is considered that the third yoke 24 might be separated and disposed away from the first yoke 23.

In this case, when the nonmagnetic members 25 are not attached to the surface 24a of the third yoke 24 which faces the second yoke 33, the third yoke 24 is magnetically attracted by the second yoke 33, thereby causing the possibility that the third yoke 24 is magnetically adsorbed to the second yoke 33. When the third yoke 24 is adsorbed by the second yoke 33, a magnetic balance between the magnetic circuit of the actuator 20 and the magnetic circuit of the actuator 30 collapses, and the movable lens groups 4 and 6 cannot accurately be driven and controlled.

Consequently, in the present embodiment, the nonmagnetic members 25 are attached to the surface 24a of the third yoke 24 which faces the second yoke 33, so that even when the third yoke 24 is disposed away from the first yoke 23, the disadvantage that the third yoke 24 is magnetically adsorbed by the second yoke 33 is prevented. That is, the nonmagnetic members 25 each having a predetermined thickness are attached to the surface 24a of the third yoke 24 so that the third yoke 24 does not come close to a distance at which the magnetic force of the second magnet 32 attached to the second yoke 33 acts.

Figure 17:
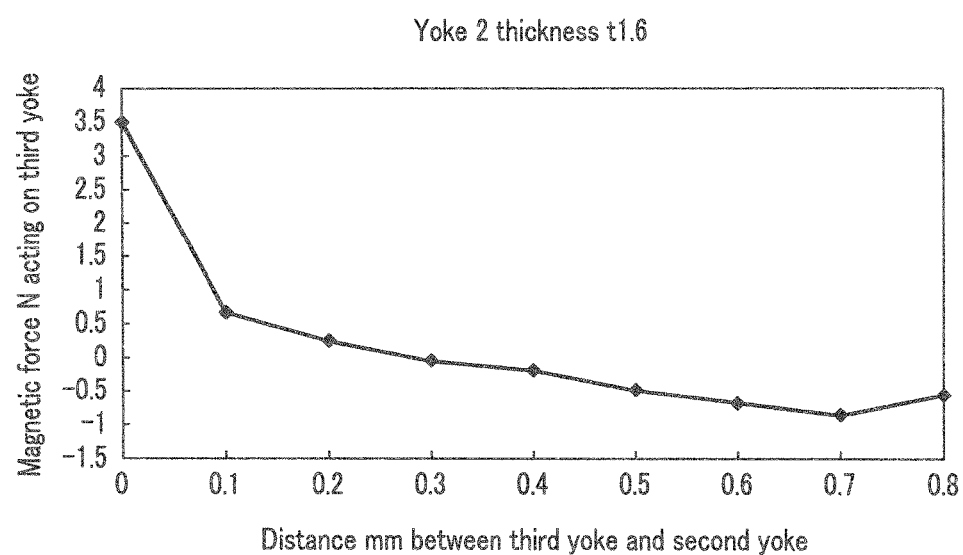
FIG. 17 is a graph showing a relation between a distance from the third yoke to the second yoke and a magnetic force acting on the third yoke.

FIG. 17 is a graph showing the result of measurement of the magnetic force acting between the second yoke 33 and the third yoke 24, when the distance between the second yoke 33 and the third yoke 24 is changed in the assembly 40 incorporated in the interchangeable lens 100 of the present embodiment. When the magnetic force indicated along the ordinate of the graph has a plus value, it is indicated that the magnetic force acts in a direction in which the third yoke 24 is sucked by the second yoke 33, and when the magnetic force has a minus value, it is indicated that the magnetic force acts in a direction in which the third yoke 24 is sucked by the first yoke 23.

Thus, when the distance between the third yoke 24 and the second yoke 33 is in excess of 0.3 mm and the yokes come close to each other, it is seen that the third yoke 24 is attracted by the second yoke 33. In other words, it is seen that, when the distance between the third yoke 24 and the second yoke 33 is 0.3 mm or more, the third yoke 24 is attracted by the first yoke 23. Consequently, in the present embodiment, a thickness of the nonmagnetic member 25 was designed to 0.3 mm or more, e.g., 1.0 mm. In consequence, if the third yoke 24 is disposed away from the first yoke 23 and the nonmagnetic members 25 come closer to the second yoke 33 to come in contact with the second yoke, the third yoke 24 is not adsorbed by the second yoke 33, but the third yoke 24 returns to a position where the third yoke is adsorbed by the first yoke 23.

As described above, the nonmagnetic members 25 each having a predetermined thickness are attached to the third yoke 24, so that even when a strong impact is applied to the interchangeable lens 100, the two actuators 20 and 30 can normally be operated, and the two movable lens groups 4 and 6 can accurately be driven and controlled.

Hereinafter, a second embodiment will be described with reference to FIG. 18 and FIG. 19. An interchangeable lens 100 of the second embodiment has a structure similar to the first embodiment except a shape of a nonmagnetic member 61. Therefore, a structure different from that of the first embodiment is only described here, and constitutional elements that function similarly to those of the first embodiment are denoted with the same reference signs to omit detailed description of the elements.

FIG. 18 is a perspective view showing a structure of a main part of actuators 20 and 30, and FIG. 19 is a perspective view of the structure of FIG. 18 seen from an opposite side. In the present embodiment, one rectangular sheet-like nonmagnetic member 61 is attached to a surface 24a of a third yoke 24 which faces a second yoke 33. In a state where the third yoke 24 is adsorbed by an opening 230 of a first yoke 23, a clearance is formed between the nonmagnetic member 61 attached to the surface 24a of the third yoke 24 and an end portion of the second yoke 33 on the side of an opening 330.

Also in the present embodiment, a thickness of the nonmagnetic member 61 is designed in the same manner as in the first embodiment. Consequently, even when the third yoke 24 is separated from the first yoke 23 to come close to a distance at which the nonmagnetic member 61 comes in contact with the end portion of the second yoke 33 on the side of the opening 330, the third yoke 24 is not magnetically adsorbed by the second yoke 33, but returns to an original position where the third yoke is magnetically adsorbed by the first yoke 23.

In addition, according to the present embodiment, the nonmagnetic member 61 is interposed between a projection 23g of a first portion 23a of the first yoke 23 and the second yoke 33 and between a projection 23h of a second portion 23b of the first yoke 23 and the second yoke 33, a magnetic influence between the first yoke 23 and the second yoke 33 can be made smaller, and the abovementioned disadvantage due to mutual induction can more securely be prevented.

Next, a third embodiment will be described with reference to FIG. 20 and FIG. 21. An interchangeable lens 100 of the third embodiment has a structure similar to the second embodiment, except that a fourth yoke 71 to close an opening 330 of a second yoke 33 is added. Therefore, here, a structure different from that of the second embodiment is only described, and constitutional elements that function similarly to those of the second embodiment are denoted with the same reference signs to omit detailed description of the elements.

FIG. 20 is a perspective view showing a structure of a main part of actuators 20 and 30, and FIG. 21 is a perspective view of the structure of FIG. 20 seen from an opposite side. In the present embodiment, the fourth yoke 71 is attached to the opening 330 of the second yoke 33. A clearance is formed between a nonmagnetic member 61 attached to a third yoke 24 and the fourth yoke 71.

Also in the present embodiment, a thickness of the nonmagnetic member 61 is designed in the same manner as in the first embodiment. Consequently, even when the third yoke 24 is separated from a first yoke 23 to come close to a distance at which the nonmagnetic member 61 comes in contact with an end portion of the second yoke 33 on the side of the opening 330, the third yoke 24 is not magnetically adsorbed by the fourth yoke 71, but returns to an original position where the third yoke is magnetically adsorbed by the first yoke 23.

According to the present embodiment, the fourth yoke 71 to close the opening 330 of the second yoke 33 is disposed, and hence, a driving force of the actuator 30 can be strengthened. In other words, when the fourth yoke 71 is disposed as in the present embodiment, a magnetic force of a second magnet 32 can be weakened, the second magnet 32 can be miniaturized, and it is possible to lighten a device.

Next, a fourth embodiment will be described with reference to FIG. 22 and FIG. 23. An interchangeable lens 100 of the fourth embodiment has a structure similar to the third embodiment, except that a nonmagnetic member 81 is sandwiched between a third yoke 24 and a fourth yoke 71. Therefore, a structure different from that of the third embodiment is only described here, and constitutional elements that function similarly to those of the third embodiment are denoted with the same reference signs to omit detailed description of the elements.

Figure 22:
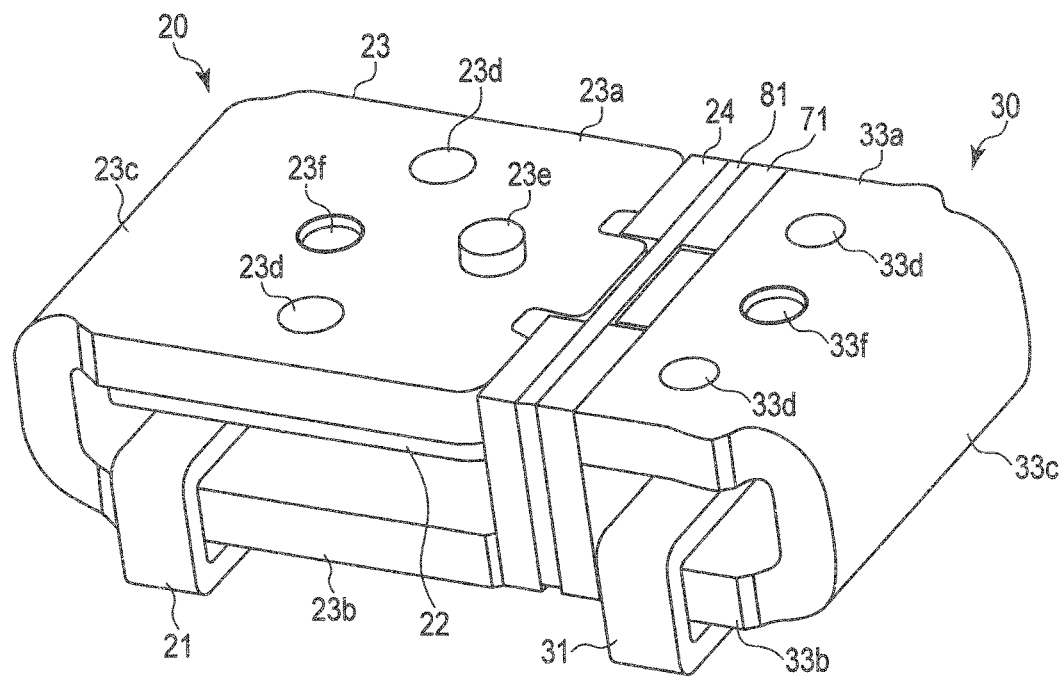
FIG. 22 is a perspective view showing a main part of an actuator according to a fourth embodiment.
Figure 23:
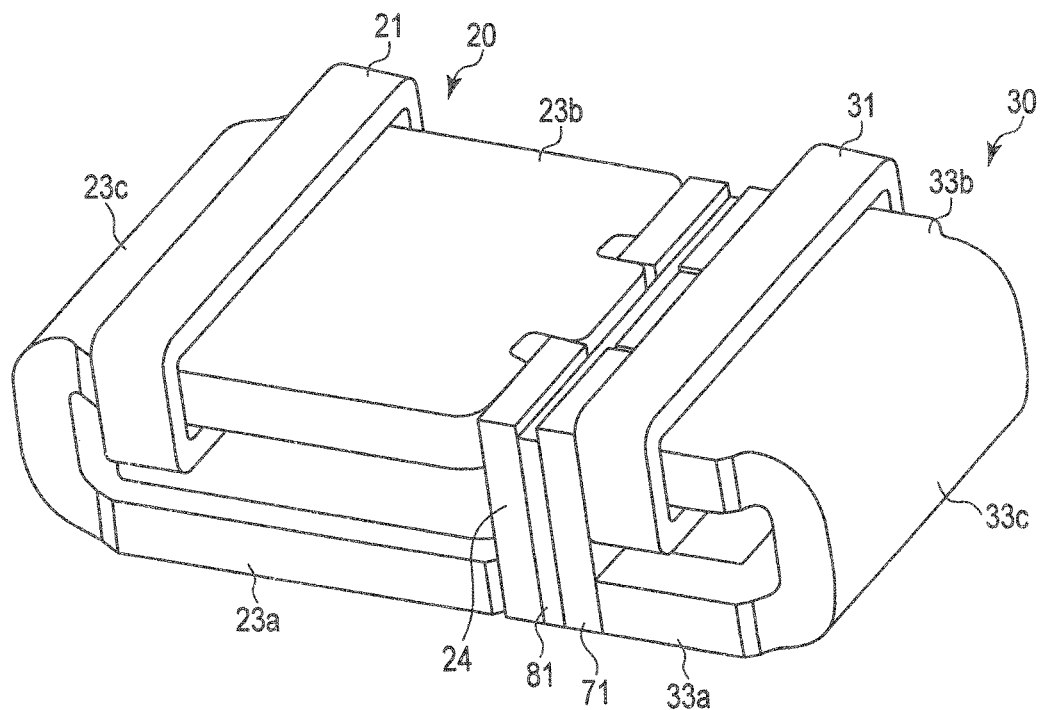
FIG. 23 is a perspective view of a constitution of FIG. 22 seen from an opposite side.

FIG. 22 is a perspective view showing a structure of a main part of actuators 20 and 30, and FIG. 23 is a perspective view of the structure of FIG. 22 seen from an opposite side. In the present embodiment, the nonmagnetic member 81 thicker than a nonmagnetic member 61 of each of the second and third embodiments is prepared, and the nonmagnetic member 81 is interposed between two yokes 24 and 71 so that one surface of the nonmagnetic member 81 comes in contact with the third yoke 24 under pressure and the other surface of the nonmagnetic member 81 comes in contact with the fourth yoke 71 under pressure. In other words, the nonmagnetic member 81 has a thickness slightly larger than a distance between the third yoke 24 and the fourth yoke 71, and is compressed by the two yokes 24 and 71.

According to the present embodiment, by the nonmagnetic member 81, the third yoke 24 is pressed in an opening 230 of a first yoke 23, and the fourth yoke 71 is pressed in an opening 330 of a second yoke 33, and hence, even when a strong impact is applied to the interchangeable lens 100 from the outside, the third yoke 24 is not separated from a first yoke 23, or the fourth yoke 71 is not separated from the second yoke 33.

It is to be noted that the present invention is not limited to the above embodiments, and can arbitrarily be changed without departing from the scope of the invention.

For example, in the abovementioned embodiments, the first yoke 23 and the second yoke 33 are formed into the U-shape, but the embodiments are not limited to this example, and the yokes may have any shape as long as the first yoke is disposed away from the second yoke in the optical axis O direction to separate the magnetic circuits of the two actuators 20 and 30.

Additionally, in the above embodiments, the nonmagnetic members 25 are attached to the surface 24a of the third yoke 24 which faces the second yoke 33, but the present invention is not limited to this example, and a nonmagnetic member may be attached to an end portion of the second yoke 33 which faces the third yoke 24 or the nonmagnetic member may be disposed independently of the yoke.

The invention claimed is:

1. A lens barrel in which a first movable member holding a first lens group and a second movable member holding a second lens group are arranged in an optical axis direction and are movably stored, the lens barrel comprising:
    a first actuator in which a first magnetic circuit is constituted of a first coil, a first magnet disposed to face the first coil, and a first yoke, the first actuator moving the first movable member in the optical axis direction by the first magnetic circuit; and
    a second actuator in which a second magnetic circuit magnetically independent of the first magnetic circuit is constituted of a second coil, a second magnet disposed to face the second coil, and a second yoke, the second actuator moving the second movable member in the optical axis direction by the second magnetic circuit,
    wherein:
    the first yoke is disposed away from the second yoke by a predetermined distance in the optical axis direction,
    each of the first yoke and the second yoke has a pair of extending portions which extend in a direction parallel to the optical axis direction and which are disposed to face each other in a direction perpendicular to the optical axis direction, each pair of extending portions being coupled with each other at a first side end thereof and forming an opening at a second end side thereof, and
    the opening of the first yoke and the opening of the second yoke face each other and are disposed away from each other by a predetermined distance.

2. The lens barrel according to claim 1, further comprising:
    a fixing portion to fix the first yoke and the second yoke,
    wherein a positioning portion to position one of the opening of the first yoke and the opening of the second yoke in the optical axis direction is disposed on an inner wall of the fixing portion.

3. The lens barrel according to claim 1, wherein a cross section of the first yoke in the optical axis direction is a U-shaped cross section an end portion of which is disposed away from the second yoke and is turned back, and a cross section of the second yoke in the optical axis direction is a U-shaped cross section an end portion of which is disposed away from the first yoke and is turned back.

4. The lens barrel according to claim 1, wherein a third yoke is disposed in at least one of the opening of the first yoke and the opening of the second yoke to close a respective one of the first magnetic circuit and the second magnetic circuit.

5. The lens barrel according to claim 4, wherein a nonmagnetic member is disposed on the third yoke.

6. The lens barrel according to claim 5, wherein a clearance is provided between the nonmagnetic member and the opening of the second yoke.

7. The lens barrel according to claim 5, wherein the nonmagnetic member is provided, via a clearance, to each of the opening of the first yoke and the opening of the second yoke.

8. The lens barrel according to claim 4, wherein each of the first yoke and the second yoke has a pair of extending portions which extend in the optical axis direction and which are disposed to face each other in a direction perpendicular to the optical axis direction, each pair of extending portions being closed at a first side end thereof and forming an opening at a second side end thereof.

9. The lens barrel according to claim 5, wherein the nonmagnetic member has a thickness such that the third yoke is not magnetically adsorbed by the second yoke by a magnetic force of the second magnet in a state in which the third yoke is disposed away from the first yoke and the nonmagnetic member comes in contact with the second yoke.

* * * * *